H. WEBSTER,

Assignor to the JANNEY CAR COUPLING COMPANY.

Car-Coupling.

No. 8,701. Reissued May 6, 1879.

WITNESSES:

T. S. Mott

Corneliuc Cox

INVENTOR:

HAZEN WEBSTER,

BY

H. W. Beadle & Co.

ATTYS.

UNITED STATES PATENT OFFICE.

HAZEN WEBSTER, OF ELGIN, ILLINOIS, ASSIGNOR TO THE JANNEY CAR COUPLING COMPANY, OF ALEXANDRIA, VIRGINIA.

IMPROVEMENT IN CAR-COUPLINGS.

Specification forming part of Letters Patent No. 39,436, dated August 4, 1863; Reissue No. 8,701, dated May 6, 1879; application filed January 28, 1879.

*To all whom it may concern:*

Be it known that I, HAZEN WEBSTER, of Elgin, county of Kane, and State of Illinois, have invented a new and useful Improvement in Car-Couplings; and I do hereby declare that the following is a full, clear, and exact description of the same, reference being had to the accompanying drawings, and to the letters of reference marked thereon.

This invention is a twin coupling—that is, one in which the coupling parts, *per se*, are identical with each other; and its novelty consists, mainly, first, in the combination, with a rigid draw-head, of a pivoted hook; and, second, in the combination, with a draw-head, of a projecting guard-arm, as will be fully described hereinafter.

Figure 1:
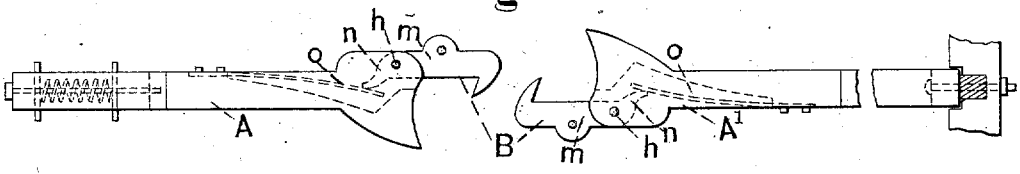
Figure 2:
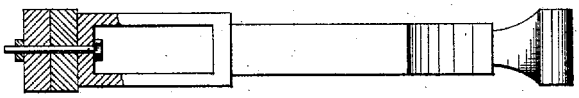
Figure 3:
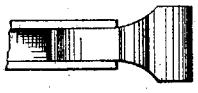
Figure 4:
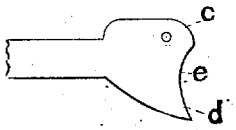

In the drawings, Figure 1 is a plan view of our improved twin coupling; Fig. 2, an inner side view of the same; Fig. 3, an outer side view; Fig. 4, a detached view of the draw-head; and Figs. 5 to 8, diagrams illustrating the operation of the coupling.

Each of the draw-heads A A′ is provided with projections *c* and *d*, Fig. 4, between which is the cavity *e*, referred to hereinafter.

A lever, B, Fig. 1, is pivoted by a pin, *h*, to the projection *c*, Fig. 4, of the draw-head, this lever having two arms, *m* and *n*, Fig. 1, one of which, *m*, is hooked, as shown. Hence this element of our invention may be termed a "pivoted hooked lever" or a "pivoted hook," which is so held in the draw-head as to be capable of swinging or vibrating to a limited extent upon its pivot.

O represents a spring, by means of which the hook is returned to its normal position after vibration.

The operation of the twin coupling may be best understood by reference to views Figs. 5 to 8.

Figure 5:
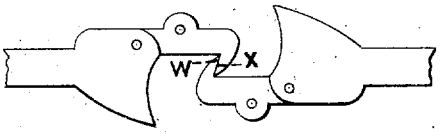

In Fig. 5 the coupling is under tension, the pivoted hooks being interlocked. It will be observed that the hooks are so beveled when they are in contact with each other that the projecting point *w* of one hook shall fit into the recess of the other. Hence, when the hooks are secured each to its draw-head, they will be self-retaining in an interlocked condition.

Figure 6:
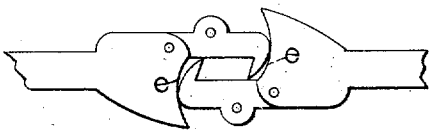

Fig. 6 shows the condition of the twin coupling when the two parts are bumped together, the nose of the pivoted hook of one draw-head fitting into the cavity *e* of the other draw-head.

Figure 7:
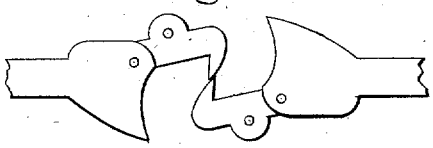
Figure 8:
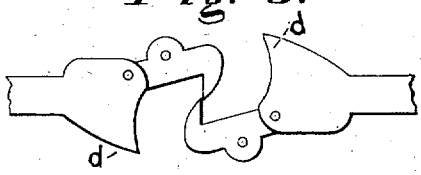

The device is self-coupling. When two cars meet each other, each having a draw-head with pivoted hook, as described, the nose of the hook of one draw-head will strike that of the other, and both hooks will vibrate to a limited extent in a lateral direction, as shown in Fig. 7, the noses of the two hooks sliding against each other until they reach the relative position shown in Fig. 8, when the hooks will be interlocked by the tendency of the springs to force the ends of the hook toward each other, the projection *d* not being long enough to prevent this interlocking. These projections hence act as guards to prevent uncoupling under circumstances which afford the greatest inducement for the device to become uncoupled—that is, when the cars are on a down grade. The surface of the cavity *e* serves also as a bumper.

Having thus described my invention, what I claim as new, and desire to secure by Letters Patent, is—

1. A twin coupling each part of which has a draw-head combined with a hook pivoted to a projection on said draw-head, so as to swing thereon.

2. The combination of a pivoted hook with a draw-head having a guard, *d*, substantially as described.

3. The combination, in a twin coupling, of a draw-head having a pivoted hook with a cavity, *e*, in the other draw-head, for receiving the nose of said pivoted hook.

4. In a twin coupling, a draw-head having a connecting-hook and bumper-surface, as described.

This specification signed and witnessed this 17th day of January, 1879.

HAZEN WEBSTER.

Witnesses:
S. STERNBERGER,
H. W. BEADLE.